United States Patent
Sandrasekaran et al.

(10) Patent No.: US 12,311,918 B2
(45) Date of Patent: May 27, 2025

(54) METHODS AND SYSTEMS FOR MONITORING VEHICLE LOAD DISTRIBUTION

(71) Applicant: Volvo Truck Corporation, Gothenburg (SE)

(72) Inventors: Ramachandran Sandrasekaran, Karnataka (IN); Kent Augustsson, Bollebygd (SE); Marcel Palmgren, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 174 days.

(21) Appl. No.: 17/777,412

(22) PCT Filed: Nov. 22, 2019

(86) PCT No.: PCT/EP2019/082302
§ 371 (c)(1),
(2) Date: May 17, 2022

(87) PCT Pub. No.: WO2021/098974
PCT Pub. Date: May 27, 2021

(65) Prior Publication Data
US 2022/0402482 A1 Dec. 22, 2022

(51) Int. Cl.
*B60G 17/017* (2006.01)
*B60G 17/016* (2006.01)
(Continued)

(52) U.S. Cl.
CPC .......... *B60W 30/02* (2013.01); *B60G 17/016* (2013.01); *B60G 17/017* (2013.01);
(Continued)

(58) Field of Classification Search
CPC ........................... B60G 17/017; B60W 30/02
See application file for complete search history.

(56) References Cited

U.S. PATENT DOCUMENTS

| 5,032,821 A | 7/1991 | Domanico et al. |
| 5,167,289 A | 12/1992 | Stevenson |

(Continued)

FOREIGN PATENT DOCUMENTS

| CN | 101610927 A | 12/2009 |
| EP | 2446404 B1 | 12/2016 |
| WO | 2018111821 A1 | 6/2018 |

OTHER PUBLICATIONS

International Search Report and Written Opinion for International Patent Application No. PCT/EP2019/082302, mailed Aug. 10, 2020, 14 pages.
(Continued)

*Primary Examiner* — Long T Tran
(74) *Attorney, Agent, or Firm* — Withrow & Terranova, PLLC (57) ABSTRACT

A control unit arranged to monitor a load distribution of a vehicle when the vehicle is in motion, the control unit comprising an interface arranged to receive a plurality of load values associated with one or more vehicle axles and/or one or more vehicle wheels from a plurality of load sensors arranged on the vehicle, wherein the control unit is arranged to determine a vehicle load distribution based on the plurality of load values, to compare the determined vehicle load distribution to a pre-determined allowable vehicle load distribution, and to trigger an emergency procedure in case the determined vehicle load distribution differs from the pre-determined vehicle load distribution by more than an allowable amount.

14 Claims, 4 Drawing Sheets

(51) Int. Cl.
   *B60G 17/019*  (2006.01)
   *B60K 31/00*   (2006.01)
   *B60T 8/1766*  (2006.01)
   *B60W 10/18*   (2012.01)
   *B60W 10/22*   (2006.01)
   *B60W 30/02*   (2012.01)
   *G07C 5/08*    (2006.01)

(52) U.S. Cl.
   CPC ............ *B60G 17/019* (2013.01); *B60K 31/00* (2013.01); *B60T 8/1766* (2013.01); *B60W 10/18* (2013.01); *B60W 10/22* (2013.01); *G07C 5/0816* (2013.01); *B60G 2300/02* (2013.01); *B60G 2400/61* (2013.01); *B60G 2500/10* (2013.01); *B60K 2031/0091* (2013.01); *B60W 2300/12* (2013.01); *B60W 2710/18* (2013.01); *B60W 2710/226* (2013.01); *B60W 2720/10* (2013.01)

(56) References Cited

U.S. PATENT DOCUMENTS

| | | | |
|---|---|---|---|
| 5,393,937 A | | 2/1995 | Etherington et al. |
| 5,681,998 A | * | 10/1997 | Nakazaki ............. G01L 5/0004 |
| | | | 73/862.626 |
| 5,825,284 A | * | 10/1998 | Dunwoody ............ B61F 5/245 |
| | | | 340/440 |
| 5,952,587 A | | 9/1999 | Rhodes et al. |
| 6,829,943 B2 | * | 12/2004 | Weyand ............... G01G 19/086 |
| | | | 73/862.53 |
| 6,985,795 B2 | * | 1/2006 | Scotese ................ B66C 23/905 |
| | | | 700/218 |
| 2002/0038193 A1 | * | 3/2002 | Grunberg ............. G01G 19/08 |
| | | | 701/37 |
| 2003/0220729 A1 | | 11/2003 | Doddek et al. |
| 2005/0167165 A1 | * | 8/2005 | Takeda .................... B60G 5/04 |
| | | | 177/136 |
| 2006/0070460 A1 | | 4/2006 | Knokke et al. |
| 2006/0137471 A1 | | 6/2006 | Sentoku et al. |
| 2007/0078581 A1 | | 4/2007 | Nenninger et al. |
| 2008/0272899 A1 | * | 11/2008 | Penzotti ............. B60T 8/17554 |
| | | | 701/1 |
| 2009/0138191 A1 | * | 5/2009 | Engelhard ............ B60W 40/13 |
| | | | 340/440 |
| 2012/0209502 A1 | * | 8/2012 | Nichols ................ B62D 53/021 |
| | | | 701/124 |
| 2016/0318421 A1 | * | 11/2016 | Healy .................... B60L 58/10 |
| 2017/0314986 A1 | * | 11/2017 | Dyal .................... B62D 53/061 |
| 2020/0010062 A1 | * | 1/2020 | Switkes ................. B60T 8/1887 |
| 2020/0055471 A1 | * | 2/2020 | Niedert ................. G06F 3/0482 |
| 2020/0055521 A1 | * | 2/2020 | Pearson ................ B60W 40/13 |
| 2021/0162965 A1 | * | 6/2021 | Mellings ............... B60T 8/1755 |

OTHER PUBLICATIONS

International Preliminary Report on Patentability for International Patent Application No. PCT/EP2019/082302, mailed Mar. 31, 2022, 16 pages.
Intention to Grant for European Patent Application No. 19809435.1, mailed Oct. 27, 2023, 30 pages.
First Office Action for Chinese Patent Application No. 201980102320.9, mailed Dec. 25, 2024, 48 pages.

\* cited by examiner

FIG. 9

METHODS AND SYSTEMS FOR MONITORING VEHICLE LOAD DISTRIBUTION

This application is a 35 USC 371 national phase filing of International Application No. PCT/EP2019/082302, filed Nov. 22, 2019, the disclosure of which is incorporated herein by reference in its entirety.

TECHNICAL FIELD

The present disclosure relates to monitoring of vehicle load distribution and to vehicle control based on the monitored load distribution.

The invention can be applied in heavy-duty vehicles, such as trucks, buses and construction equipment. Although the invention will be described mainly with respect to trucks and semi-trailer vehicles, the invention is not restricted to this particular type of vehicle.

BACKGROUND

Vehicle load distribution refers to how weight is distributed between different vehicle axles, and/or between different vehicle wheels. Vehicle load distribution has a significant impact on vehicle dynamics. For instance, in case the weight on driven wheels is too low, the vehicle may not be able to start due to poor traction. Braking capability is also affected by the load on a given wheel. Therefore, care must be taken during loading of a vehicle so that the load distribution is kept reasonably even.

EP 2446404 B1 relates to a system for automatically monitoring vehicle load distribution. However, there is a need for more refined methods and systems for monitoring vehicle load distribution.

SUMMARY

It is an object of the present disclosure to provide techniques and devices for monitoring vehicle load distribution in order to detect and trigger suitable action if a significant shift in vehicle load distribution is detected during vehicle operation.

This object is obtained by a control unit arranged to monitor a load distribution of a vehicle at least when the vehicle is in motion. The control unit comprises an interface arranged to receive a plurality of load values associated with one or more vehicle axles and/or with one or more vehicle wheels, from a plurality of load sensors arranged on the vehicle. The control unit is arranged to determine a vehicle load distribution based on the plurality of load values, and to compare the determined vehicle load distribution to a pre-determined allowable vehicle load distribution. The control unit is also arranged to trigger an emergency procedure in case the determined vehicle load distribution differs from the pre-determined vehicle load distribution by more than an allowable amount.

This way a significant shift in cargo can be detected and a suitable response action may be automatically triggered. This increases vehicle safety and also provides additional protection of the cargo, since the cargo is now less likely to be damaged by a cargo shift. The vehicle overall stability is often improved since vehicle operation with shifted cargo, potentially leading to an unstable vehicle, may be prevented before an undesired event such as a roll-over occurs.

To exemplify the proposed technique, after loading or unloading cargo, the load distribution of the vehicle is regularly or even continuously monitored in order to be able to detect if a significant shift in weight distribution occurs during transportation. The shift may be with respect to some allowed absolute weight distribution or relative with respect to some initial weight distribution. If the cargo shifts beyond, e.g., some predefined boundaries, the driver is alerted to check the cargo since it indicates that cargo is sliding, fixation of cargo is not properly done or has failed for some reason. On automated vehicles the vehicles can be halted or just triggered to send an alert to a control tower depending on pre-determined boundary conditions. These measures are taken to mitigate loss of vehicle stability or in worst case loss of cargo.

According to aspects, the control unit is arranged to detect a shift in cargo when the vehicle is in motion by comparing the determined vehicle load distribution to one or more previously determined vehicle load distributions. This means that the vehicle is able to detect a shift in cargo in a relative sense. In other words, the initial cargo distribution is assumed to be a valid distribution, and any significant change in distribution compared to this initial distribution is deemed unallowable and will trigger some action in response to the shift.

According to other aspects, the pre-determined allowable vehicle load distribution is an absolute load distribution in terms of, e.g., axle pressure distribution or tyre normal force distribution.

According to aspects, the emergency procedure comprises any of: triggering a warning signal to alert a vehicle operator, executing an emergency stop manoeuvre, reducing a maximum allowable vehicle velocity associated with the vehicle, and/or adjusting a planned vehicle trajectory to reduce a vehicle lateral acceleration. Thus, it is appreciated that several different emergency procedures can be triggered, ranging from low complexity plain warning signals to more complex autonomous vehicle control operations.

According to aspects, the emergency procedure comprises reducing any of; a maximum allowable service brake torque request value, a maximum allowable auxiliary brake torque request, and/or a brake controller wheel slip limit. This means that the herein proposed techniques can be incorporated with advantage in the vehicle braking system, thereby increasing vehicle braking robustness and overall safety.

According to aspects, the emergency procedure comprises adjusting a pitch control parameter to increase dampening of a fifth wheel arrangement of the vehicle. Adjusting pitch to increase dampening, or even locking the fifth wheel, may prevent some undesirable events such as vehicle roll-over.

According to aspects, the emergency procedure comprises adjusting a dampening parameter to of an active suspension system of the vehicle. Adjusting the dampening parameter of the suspension system may provide a required increase in vehicle stability in order to counter the negative effects of the detected shift in cargo.

According to aspects, the plurality of load sensors are configured to measure respective load values associated with the one or more vehicle axles and/or the one or more vehicle wheels when the vehicle is stationary. This means that the herein proposed techniques can also be used when the vehicle is stationary, which is an advantage. The control unit may, e.g., provide for more efficient and safe cargo loading operations.

According to aspects, the control unit is arranged to control a visual indication device in dependence of the load values associated with the one or more vehicle axles and/or the one or more vehicle wheels when the vehicle is stationary. The visual indication device may, e.g., be an in-cabin display of the vehicle and/or a display device arranged on the vehicle exterior. The visual indication device simplifies proper loading of the vehicle in an efficient manner, leading to both increased efficiency and also to more correctly loaded vehicles.

According to aspects, the control unit is communicatively coupled to a second vehicle and arranged to control loading of the vehicle by the second vehicle. This way loading can be made even more efficient, since the loading vehicle receives a live feed of the loading state of the vehicle being loaded. These aspects may be particularly relevant in the context of autonomous vehicles.

There are also disclosed herein vehicles, methods, computer program products, and systems for monitoring load distribution associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
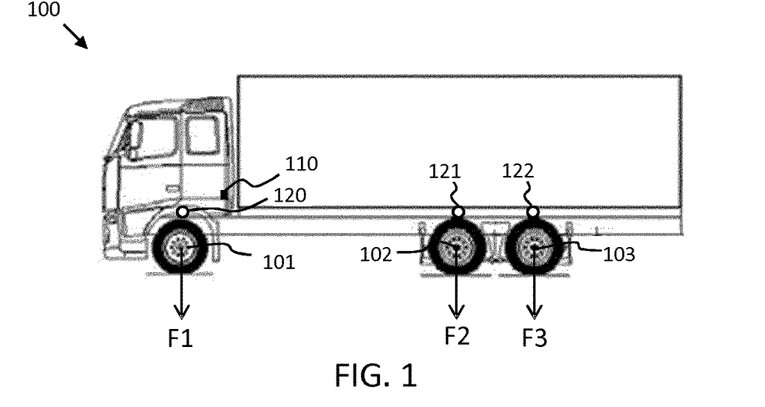
FIGS. 1-2 schematically illustrate vehicles with respective load distributions.

FIG. 1 schematically illustrates a truck 100, i.e., a heavy-duty vehicle for cargo transport. The truck has three axles 101, 102 and 103. Each axle is associated with a respective axle load F1, F2 and F3. Each axle is associated with a wheel pair, normally a left and a right wheel. The wheels are associated with respective wheel loads. The vehicle 100 also comprises visual indication means 120, 121, 122 for indicating a current load distribution. These will be discussed in more detail below.

Figure 2:
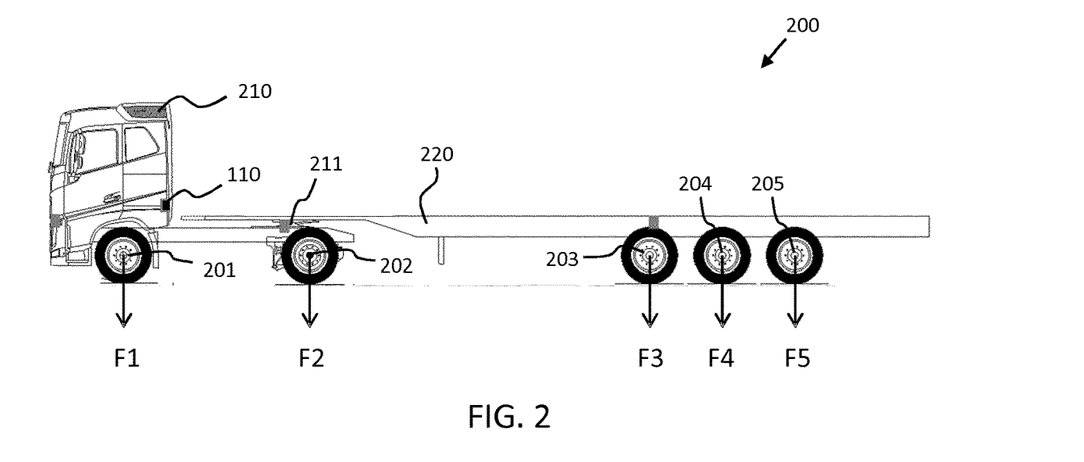

FIG. 2 schematically illustrates an articulated vehicle 200 comprising two vehicle units. The first unit 210 is a tractor unit and the second unit 220 is a trailer unit. Each vehicle unit 210, 220 comprises axles 201-205 associated with respective axle loads F1-F5, and wheels associated with respective wheel loads.

One or more load sensors are arranged on each vehicle and configured to monitor vehicle load distribution. A vehicle load distribution may, e.g., comprise a distribution of axle loads, a distribution of load over the different wheels of the vehicle, and/or a distribution of load on the left and right sides of the vehicle. Load distribution may be determined as absolute load (in terms of weight in kilograms or force in Newton), or in terms of relative load, i.e., in terms of a dimensionless ratio. The more heavily laden a vehicle is, the higher the axle load and the wheel load. If the cargo is symmetrically loaded on the vehicle, the load distribution is even, while an asymmetric loading causes an uneven load distribution.

Various load sensor types for measuring load will be discussed below in connection to FIG. 3.

The truck 100 and the semi-trailer vehicle 200 also comprises respective control units 110 arranged to obtain load data from the load sensors and to control the vehicle based on the load data. A control unit 110 may be realized as a single physical entity or as a plurality of units or modules distributed over the vehicle. An example control unit 110 will be discussed in more detail below in connection to FIG. 6, where a vehicle motion management (VMM) module is discussed.

Figure 3:
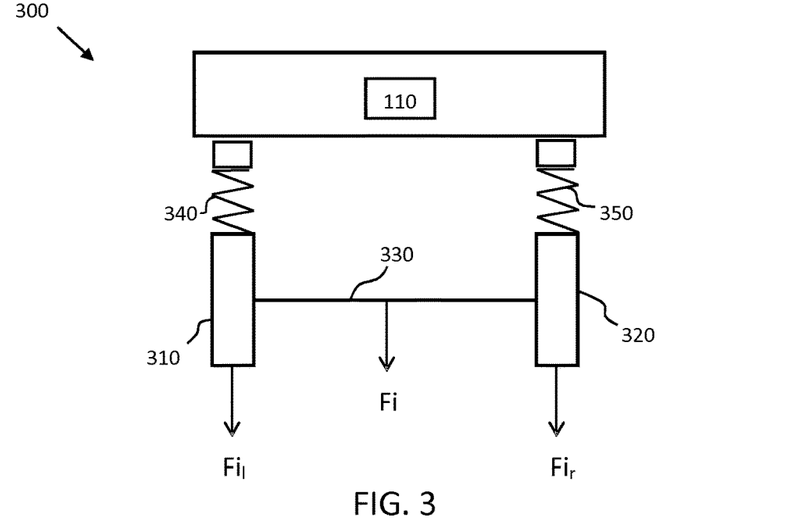
FIG. 3 schematically shows a rear view of a vehicle wheel pair.

FIG. 3 schematically shows a rear view 300 of a vehicle wheel pair, such as the wheels on one of the axles of the vehicles 100, 200 in FIGS. 1-2. In general, a wheel pair comprises left 310 and right 320 side wheels supported on an axle 330. The axle load Fi of the i:th vehicle axle is distributed over the wheel pair, such that the left hand side wheel 310 is associated with a load $Fi_l$, and the right hand side wheel 320 is associated with a load $Fi_r$. For example, the load F1 on the first axle 101 of the vehicle 100 is distributed over a wheel pair as $F1_l$ and $F1_r$.

A variety of different load sensors can be used to determine axle and/or wheel loads. For instance, bellow pressures or other compression force related values from the suspension system 340, 350, and suspension position data (from levelling sensors) from the vehicle suspension system can be used to infer vehicle load distribution.

The load on a given wheel can also be obtained by special wheel end bearings configured to measure load. For instance, US 2006/0070460 A1 discloses an example force measuring bearing which can be used to obtain a measure of the load on a wheel. In other words, one or more of the load sensors may be realized as wheel hub bearing load sensors arranged to provide respective wheel hub load values.

The data obtained from the load sensors is then sent to the control unit 110 where it is processed. The load sensors may be wired to the control unit 110, or they may be connected to the control unit via wireless link. The load sensors may furthermore comprise energy harvesting devices arranged to harvest electrical energy from vibrations of the vehicle. This way the vehicle load sensors can be made to not rely on an external power source, e.g., from the vehicle electrical system.

Having an even cargo load distribution is important in heavy duty transport vehicles such as trucks, semi-trailers and dumpers. An unevenly distributed load may affect vehicle stability and overall transport efficiency negatively. Even if the vehicle is carefully loaded initially, such that the load distribution is initially even, the load may shift during operation to cause sudden vehicle instability. The problem is especially pronounced in autonomous vehicles where no driver is present to monitor the 'feel' of the vehicle and take corrective action in response to, e.g., a shift in load.

The methods and control systems disclosed herein relate to deploying load sensors in the wheel hub bearings, in connection to the suspension system, or elsewhere on the vehicle, to monitor wheel loads and/or axle loads in real-time as the vehicle is operated, i.e., when the vehicle is in motion. The load information is taken as input by the control unit 110 which monitors the load distribution and performs an emergency procedure in case a significant shift in load distribution is detected. The emergency procedure may, e.g., comprise triggering a warning signal to alert a driver, activating safety measures by an autonomous vehicle, limiting vehicle maximum velocity, or even preventing vehicle operation in case load distribution does not meet pre-determined specifications. The load sensors can of course also be used to assist during initial loading of the vehicle, when the vehicle is stationary. Applications of the herein disclosed techniques to stationary vehicles will be discussed in more detail below.

To summarize, there is disclosed herein a control unit 110 arranged to monitor a load distribution of a vehicle 100, 200 when the vehicle is in motion. The control unit 110 comprises an interface arranged to receive a plurality of load values associated with one or more vehicle axles 101, 102, 103, 201, 202, 203, 204, 205 and/or one or more vehicle wheels 310, 320 from a plurality of load sensors arranged on the vehicle. The control unit 110 is arranged to determine a vehicle load distribution based on the plurality of load values, and to compare the determined vehicle load distribution to a pre-determined allowable vehicle load distribution. The control unit 110 executes an emergency procedure in case the determined vehicle load distribution differs from the pre-determined vehicle load distribution by more than an allowable amount. An emergency procedure may simply comprise triggering an in-cabin warning signal to alert a driver but may also comprise more advanced actions such as limiting vehicle velocity or adjusting vehicle control parameters. For an autonomous vehicle, the emergency procedure may comprise performing an emergency stop, depending on the severity of the vehicle load distribution discrepancy. More examples of emergency procedures will be given below.

The pre-determined allowable vehicle load distribution may be an absolute load distribution defined for the vehicle in terms of, e.g., a range of allowable load ratios. For instance, the allowable load distribution may specify that the ratio of loads between front and rear axles of a vehicle must be within some range. The allowable load distribution may also comprise allowable range of loads for each axle and/or for each wheel. For instance, each axle may be associated with a minimum and a maximum load in Newtons or kilograms.

The pre-determined allowable vehicle load distribution may also be a relative load distribution compared to some initial load distribution. In this case it is assumed that the vehicle is initially loaded in a proper way. The cargo is not allowed to shift from this initial load distribution by more than some allowable amount.

Combinations of the above may also be used for defining the pre-determined allowable vehicle load distribution.

Figure 4:
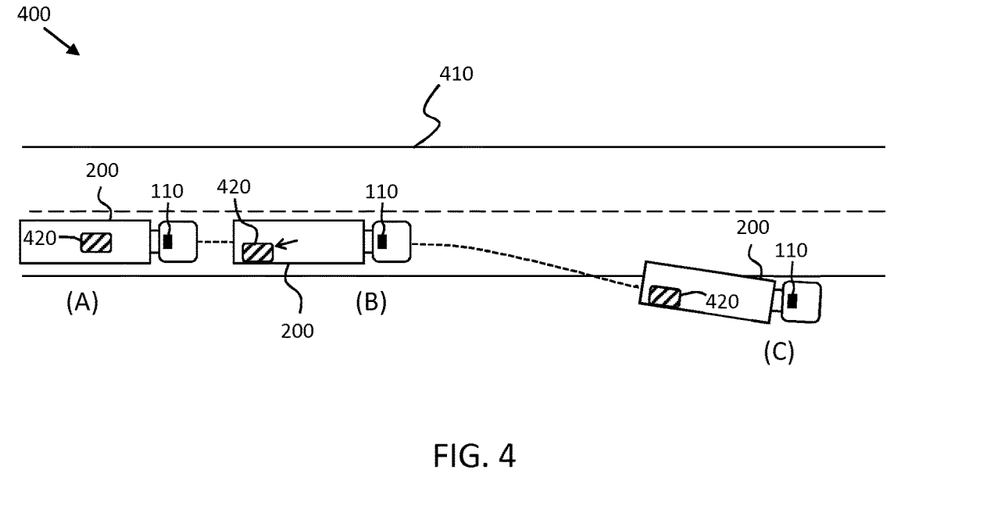
FIG. 4 shows an example vehicle maneuver.

FIG. 4 shows an example scenario 400 where the disclosed techniques may be used with advantage. A vehicle 200 comprising the control unit 110 and the load sensors is driving along a road 410. Heavy cargo 420, such as a large stone, concrete block or steel structure, is loaded onto the vehicle. The cargo 420 is initially (at point A) centred on the trailer, and vehicle load distribution is even. However, at point B, the cargo shifts rearwards and to the right side of the trailer. This shift in cargo has a negative effect on the vehicle load distribution. The load on the axles of the tractor decreases while load on the trailer wheelset increases. The load also shifts to the right-hand side wheels. An experienced driver may notice the shift in cargo from the resulting change in vehicle dynamics. However, an unexperienced driver may not notice the change in vehicle load distribution. Also, some vehicles may be autonomously driven, where no driver is present to detect the change in vehicle dynamics. The techniques disclosed herein automatically detects the change in load distribution by means of the load sensors and the control unit discussed above. For instance, the control unit 110 may be arranged to detect a shift in cargo when the vehicle 100, 200 is in motion by comparing the determined vehicle load distribution to one or more previously determined vehicle load distributions. The previously determined load distributions may correspond to an initial load distribution determined precisely after loading the vehicle, or they may be measured continuously during vehicle operation. The previously determined load distribution may also correspond to a load distribution specification determined by the vehicle manufacturer.

When a change in load distribution is detected by the control unit 110, the control unit may execute some type of emergency procedure in response to the change in load distribution. For instance, as mentioned above, the control unit may trigger an in-cabin warning signal to alert the driver of the change in load distribution. The driver may then manoeuvre the vehicle to a safe location (point C) in order to investigate the cause of the change in vehicle load distribution.

More advanced emergency procedures may also be performed by the control unit. The control unit 110 may for instance assume control of the vehicle and autonomously manoeuvre the vehicle 200 to a safe location where the vehicle can be brought to a halt. Thus, according to some aspects, the emergency procedure comprises executing an emergency stop manoeuvre.

Figure 5:
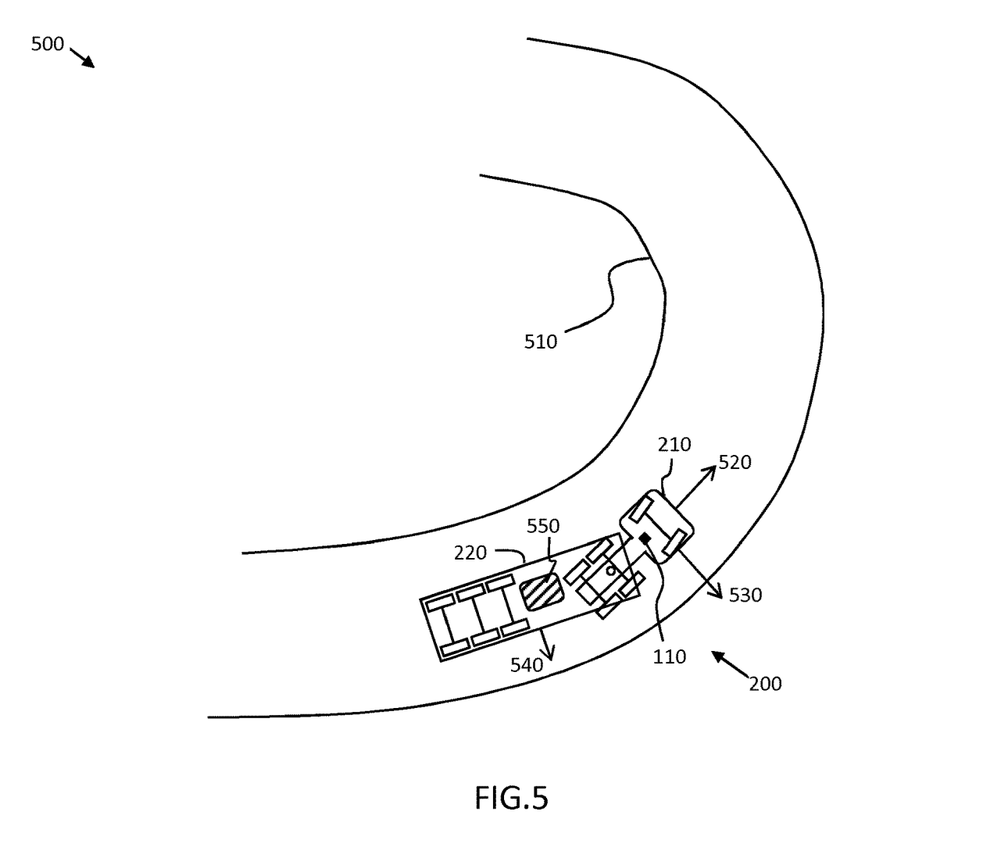
FIG. 5 shows another example vehicle maneuver.

FIG. 5 illustrates another example of the techniques and control methods proposed herein. Here, a scenario 500 is illustrated where a vehicle 200 is about to enter a turn 510 at some initial vehicle velocity 520. The trajectory necessary to negotiate the turn 510 will result in lateral forces 530, 540 acting on the tractor and on the trailer, respectively. As long as the cargo 550 is properly loaded onto the vehicle and secured so that it cannot shift, the vehicle should be able to safely follow the trajectory at the planned vehicle velocity profile. However, if the cargo shifts at a bad time, the lateral acceleration forces may lead to vehicle roll-over. The risk of roll-over can be reduced by reducing the lateral forces acting on the vehicle. Thus, if the control unit 110 detects a shift in cargo, it may impose a limitation on vehicle velocity in order to maintain vehicle stability throughout the turn 510.

Figure 6:
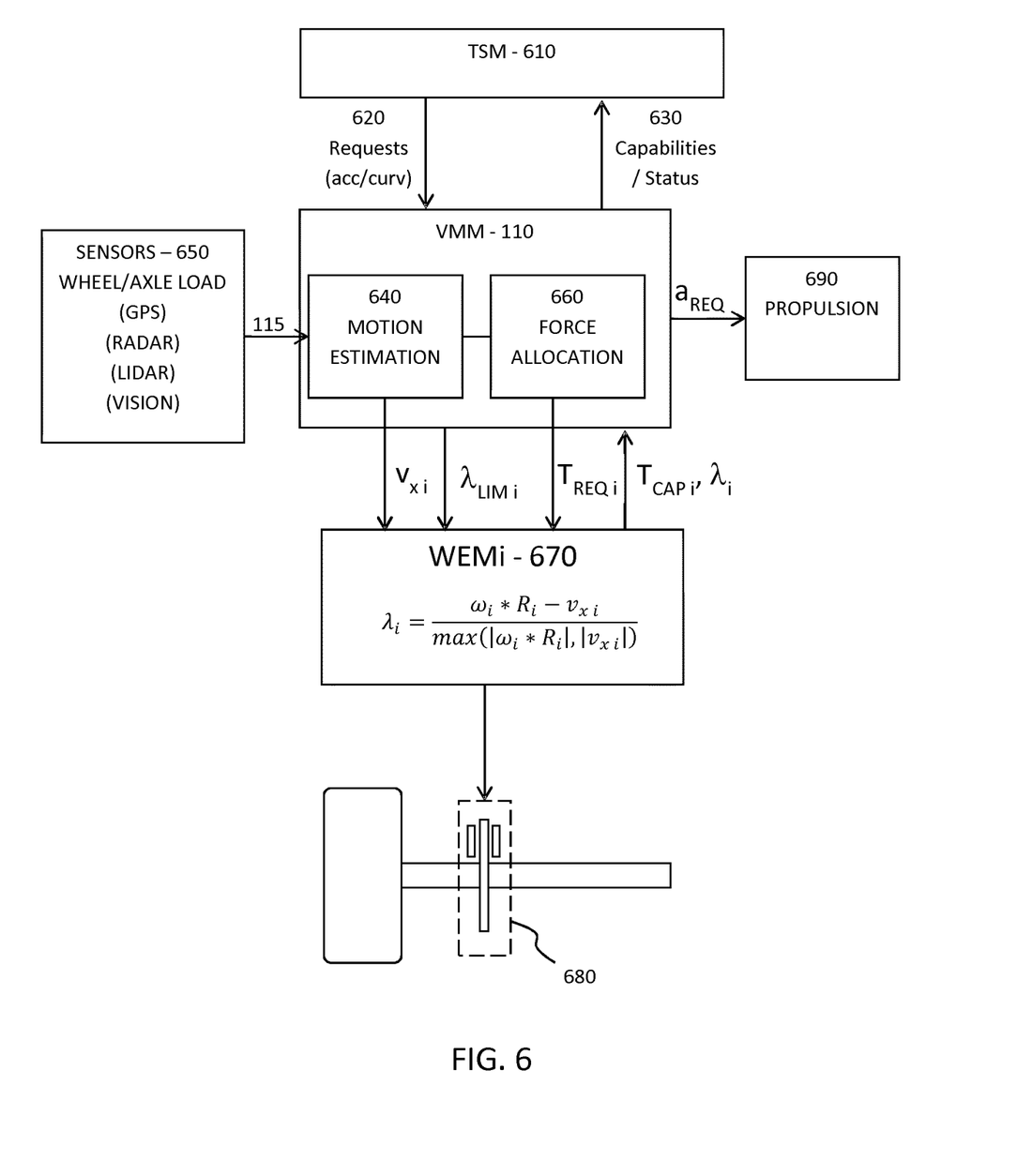
FIG. 6 illustrates an example vehicle control system.

FIG. 6 schematically shows a system for vehicle control comprising the control unit 110, here denoted as Vehicle Motion Management (VMM). A traffic situation management (TSM) module 610 plans a vehicle trajectory to be followed by the vehicle and, based on the planned trajectory, requests acceleration and curvature profiles 620 from the VMM 110. The VMM 110 responds back with current vehicle capabilities and vehicle status 630, whereby the TSM module can update and maintain the planned trajectory to, e.g., ensure vehicle safety while optimizing vehicle operation.

The VMM module 110 has access to various forms of sensor data 650 from which a vehicle state can be inferred. The sensor data comprises the data from the load sensors discussed above, but may, e.g., also comprise external data from any combination of: one or more global positioning system (GPS) receivers, one or more radio detection and ranging (radar) transceivers, one or more light detection and ranging (lidar) transceivers, and one or more vision based sensors, such as cameras and the like. Sensor data may also comprise internal sensor data from, e.g., wheel speed sensors, steering angle sensors, brake and drive torque estimators, inertial measurement unit (IMU) sensors, and the like.

The external and the internal sensor data is input to a motion and state estimation module 640 which filters the data and estimates vehicle state. Such motion and state estimation modules are known and will not be discussed in more detail herein. The vehicle state may comprise variables related to, e.g., position of the chassis in a global reference system, roll, pitch and yaw in the global reference system, as well as longitudinal velocities $v_{x\,i}$ for each wheel in a local wheel reference frame. Knowing the longitudinal velocities $v_{x\,i}$ for each wheel, in the coordinate system of the wheel, is important, as it allows the system to accurately determine wheel slip $\lambda$.

The VMM or control unit 110 determines a force allocation 660 to meet the requests from the TSM module 610. This force allocation may comprise setting torque requests $T_{REQ\,i}$ on specific wheel brakes as well as controlling propulsion sources and steering angles.

The VMM or control unit 110 also sends acceleration requests $a_{REQ}$ to the vehicle propulsion device, i.e., the combustion engine or electric motor.

The VMM module also specifies a wheel slip limit for each wheel end module (WEM), $\lambda_{LIM\,i}$, to be adhered to by the given WEM. This way, a WEM, say the i-th WEM 670, receives wheel speed $v_{x\,i}$, wheel slip limit $\lambda_{LIM\,i}$, and torque request $T_{REQ\,i}$. Based on the received parameters, the WEM controls a respective brake device 680.

The WEM may determine (and report back) a current wheel slip $$\lambda_i = \left| \frac{\omega_i * R_i - v_{xi}}{\max(|\omega_i * R_i|, |v_{xi}|)} \right|$$

where $\omega_i$ is wheel rotational velocity and $R_i$ is wheel radius.

If the VMM detects a change in load distribution and determines this change in load distribution to be significant, it may quickly increase vehicle operation safety margins to account for the potential reduction in vehicle stability. For instance, the VMM may quickly report reduced acceleration and/or velocity capabilities back to the TSM 610, it may reduce the configured wheel slip limit $\lambda_{LIM\,i}$, and it may be more restrictive when it comes to requesting brake torque from the WEMs.

With reference to FIG. 6, the emergency procedure executed by the control unit 110 in case the determined vehicle load distribution differs from the pre-determined vehicle load distribution by more than an allowable amount may comprise various actions that may be performed separately or in combination. For instance, the emergency procedure may comprise reducing a maximum allowable vehicle velocity associated with the vehicle 100, 200. For example, the VMM 110 may report reduced capabilities up to the TSM 610 since the vehicle stability may have been negatively affected by the shift in cargo. The TSM 610 then re-evaluates current and planned trajectories for the vehicle in dependence of the new reduced capabilities. The capabilities may comprise a maximum lateral force or lateral acceleration that can be tolerated. Thus, according to some aspects, the emergency procedure comprises adjusting a planned vehicle trajectory to reduce a vehicle lateral acceleration.

The VMM 110 may at least in part compensate for a shift in cargo and possible change in vehicle stability by adjusting brake torque requests, i.e., by being more careful when it comes to braking the vehicle, at least in some scenarios. Auxiliary braking, i.e., engine braking, may be inactivated if a significant cargo shift is detected, since this type of braking can be quite harsh and abrupt. Wheel slip limits imposed on the wheel brake controllers can also be reduced in order to increase safety margins. To summarize, the emergency procedure may comprise reducing any of; a maximum allowable service brake torque request value, a maximum allowable auxiliary brake torque request, and/or a brake controller wheel slip limit.

For a combination vehicle, such as the semi-trailer vehicle 200, vehicle stability may be improved, and risk of roll-over can be reduced, by adjusting a pitch control parameter to increase dampening of a fifth wheel arrangement 211 of the vehicle. This may have an effect of counteracting undesired events such as jack-knifing and certain types of vehicle roll-over events. A similar effect can be obtained by adjusting a dampening parameter of an active suspension system of the vehicle 100, 200.

The plurality of load sensors may optionally also be configured to measure respective load values associated with the one or more vehicle axles and/or the one or more vehicle wheels when the vehicle is stationary. This feature allows to monitor vehicle loading in an efficient manner. For instance, the control unit 110 may be arranged to control a visual indication device in dependence of the load values associated with the one or more vehicle axles and/or the one or more vehicle wheels when the vehicle is stationary. This visual indication device may be an in-cabin display of the vehicle 100, 200, or a display device arranged on the vehicle exterior.

This way the driver, or an operator located outside the cabin, can see the current load distribution during loading. For instance, red, yellow, and green lights may be arranged in connection to the wheels and used to indicate the current load distribution. If some wheel or axle is overloaded, then the red lights can be activated, while the green lights can be activated if the wheel or axle load is within specification. FIG. 1 shows an example where light emitting diodes (LEDs) 120, 121, 122 have been arranged in connection to the different wheel axles. Blinking lights can be used to indicate if some wheel or axle load ratio is in violation of the pre-determined allowable range of load ratios.

The control unit 110 may furthermore be communicatively coupled to a second vehicle and arranged to control loading of the vehicle 100, 200 by the second vehicle. This way the operator of the second vehicle is able to directly obtain information relating to current load distribution of the vehicle being loaded. This feature may be particularly relevant to autonomous systems where loading is performed automatically by autonomous vehicles operating without human supervision. The loading can be adapted in real time based on the data obtained via the communication coupling.

Figure 7:
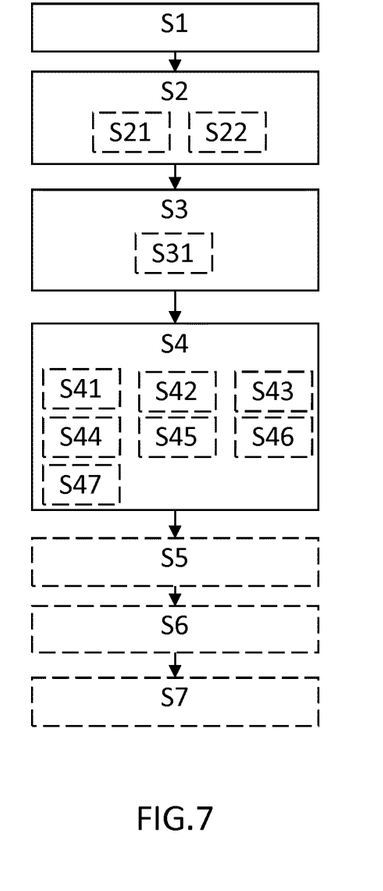
FIG. 7 is a flow chart illustrating methods.

FIG. 7 is a flow chart illustrating methods which summarize the discussions above. There is shown a method for monitoring a load distribution of a vehicle 100, 200 when the vehicle is in motion, the method comprises:

receiving S1 a plurality of load values associated with one or more vehicle axles 101, 102, 103, 201, 202, 203, 204, 205 and/or one or more vehicle wheels 310, 320 from a respective plurality of load sensors arranged on the vehicle, determining S2 a vehicle load distribution based on the plurality of load values, comparing S3 the determined vehicle load distribution to a pre-determined allowable vehicle load distribution, and executing S4 an emergency procedure in case the determined vehicle load distribution differs from the pre-determined vehicle load distribution by more than an allowable amount.

The load distribution may be determined as a relative load distribution S21, or as absolute weights or forces S22 acting on the different axles or wheels.

According to aspects, the comparing comprises detecting S31 a shift in cargo when the vehicle 100, 200 is in motion by comparing the determined vehicle load distribution to one or more previously determined vehicle load distributions.

According to aspects, executing the emergency procedure comprises triggering S41 a warning signal to alert a vehicle operator.

According to aspects, executing the emergency procedure comprises executing S42 an emergency stop manoeuvre.

According to aspects, executing the emergency procedure comprises reducing S43 a maximum allowable vehicle velocity associated with the vehicle 100, 200.

According to aspects, executing the emergency procedure comprises adjusting S44 a planned vehicle trajectory to reduce a vehicle lateral acceleration.

According to aspects, executing the emergency procedure comprises reducing S45 any of; a maximum allowable service brake torque request value, a maximum allowable auxiliary brake torque request, and/or a brake controller wheel slip limit.

According to aspects, executing the emergency procedure comprises adjusting S46 a pitch control parameter to increase dampening of a fifth wheel arrangement 211 of the vehicle 200.

According to aspects, executing the emergency procedure comprises adjusting S47 a dampening parameter to of an active suspension system of the vehicle 100, 200.

According to aspects, the method also comprises receiving S5 a plurality of load values associated with one or more vehicle axles 101, 102, 103, 201, 202, 203, 204, 205 and/or one or more vehicle wheels 310, 320 when the vehicle is stationary.

According to aspects, the method also comprises controlling S6 a visual indication device in dependence of the load values associated with the one or more vehicle axles and/or the one or more vehicle wheels when the vehicle is stationary.

According to some aspects, the visual indication device is an in-cabin display of the vehicle 100, 200.

According to some other aspects, the visual indication device is a display device arranged on the vehicle 100, 200 exterior.

According to aspects, the method also comprises communicating S7 with a second vehicle and controlling loading of the vehicle 100, 200 by the second vehicle.

Figure 8:
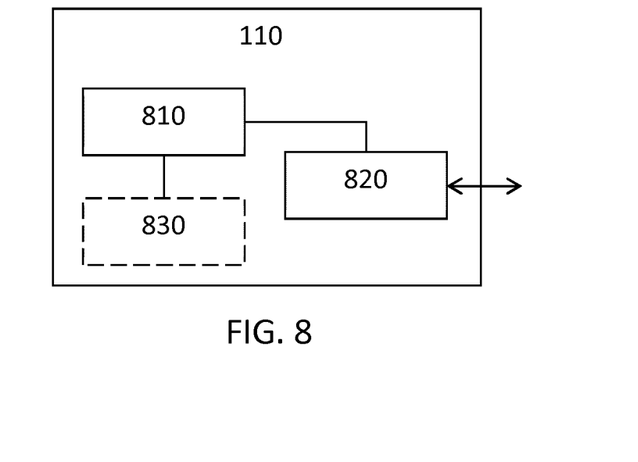
FIG. 8 schematically illustrates a control unit.

FIG. 8 schematically illustrates, in terms of a number of functional units, the components of a control unit 110 according to embodiments of the discussions herein. This control unit 110 may be comprised in the articulated vehicle 100. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 110 to perform a set of operations, or steps, such as the methods discussed in connection to FIG. 7. For example, the storage medium 830 may store the set of operations, and the processing circuitry 810 may be configured to retrieve the set of operations from the storage medium 830 to cause the control unit 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 110 may further comprise an interface 820 for communications with at least one external device, such as the load sensors and/or the second vehicle during loading. Examples of the interface 820 were also discussed above in connection to FIG. 6. As such, the interface 820 may comprise one or more transmitters and receivers, comprising analogue and digital components and a suitable number of ports for wireline or wireless communication.

The processing circuitry 810 controls the general operation of the control unit 110, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
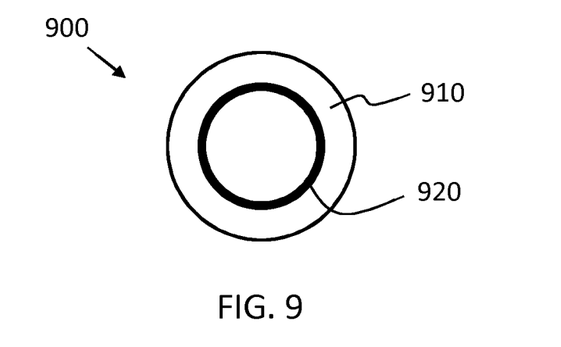
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A control unit arranged to monitor a load distribution of a vehicle, the control unit comprising:

an interface arranged to receive a plurality of load values associated with one or more vehicle axles and/or three or more vehicle wheels from a plurality of load sensors arranged on the vehicle, wherein the control unit is arranged:
- to determine a vehicle load distribution based on the plurality of load values,
- to compare the determined vehicle load distribution to a pre-determined allowable vehicle load distribution, and
- to trigger an emergency procedure in case the determined vehicle load distribution differs from the pre-determined vehicle load distribution by more than an allowable amount,
- wherein the pre-determined allowable vehicle load distribution is a relative load distribution compared to an initial load distribution,
- wherein the plurality of load sensors is configured to measure respective load values associated with the one or more vehicle axles and/or the three or more vehicle wheels when the vehicle is stationary,
- wherein the control unit is communicatively coupled to a second vehicle and arranged to control loading of the vehicle by the second vehicle; and
- wherein the control unit is arranged to control a visual indication device depending on the plurality of load values associated with the one or more vehicle axles and/or the three or more vehicle wheels when the vehicle is stationary.

2. The control unit of claim 1, wherein load sensors of the plurality of load sensors are wheel hub bearing load sensors arranged to provide respective wheel hub load values.

3. The control unit of claim 1, wherein the control unit is arranged to detect a shift in cargo when the vehicle is in motion by comparing the determined vehicle load distribution to one or more previously determined vehicle load distributions.

4. The control unit of claim 1, wherein the emergency procedure comprises triggering a warning signal to alert a vehicle operator.

5. The control unit of claim 1, wherein the emergency procedure comprises executing an emergency stop maneuver.

6. The control unit of claim 1, wherein the emergency procedure comprises reducing a maximum allowable vehicle velocity associated with the vehicle.

7. The control unit of claim 1, wherein the emergency procedure comprises adjusting a planned vehicle trajectory to reduce a vehicle lateral acceleration.

8. The control unit of claim 1, wherein the emergency procedure comprises reducing one or more of:
a maximum allowable service brake torque request value,
a maximum allowable auxiliary brake torque request, and
a brake controller wheel slip limit.

9. The control unit of claim 1, wherein the emergency procedure comprises adjusting a pitch control parameter to increase dampening of a fifth wheel arrangement of the vehicle.

10. The control unit of claim 1, wherein the emergency procedure comprises adjusting a dampening parameter of an active suspension system of the vehicle.

11. The control unit of claim 1, wherein the visual indication device is an in-cabin display of the vehicle.

12. The control unit of claim 1, wherein the visual indication device is a display device arranged on the vehicle exterior.

13. A method for monitoring a load distribution of a vehicle, the method comprising:
- receiving a plurality of load values associated with one or more vehicle axles and/or three or more vehicle wheels from a respective plurality of load sensors arranged on the vehicle,
- determining a vehicle load distribution based on the plurality of load values,
- comparing the determined vehicle load distribution to a pre-determined allowable vehicle load distribution, wherein the pre-determined allowable vehicle load distribution is a relative load distribution compared to an initial load distribution, and
- executing an emergency procedure in case the determined vehicle load distribution differs from the pre-determined allowable vehicle load distribution by more than an allowable amount,
- wherein the plurality of load sensors is configured to measure respective load values associated with the one or more vehicle axles and/or the three or more vehicle wheels when the vehicle is stationary,
- wherein the method further comprises controlling, by a control unit communicatively coupled to a second vehicle, loading of the vehicle by the second vehicle; and
- wherein the method further comprises controlling a visual indication device depending on the plurality of load values associated with the one or more vehicle axles and/or the three or more vehicle wheels when the vehicle is stationary.

14. A computer program product comprising a non-transitory computer readable medium having stored thereon a computer program comprising instructions for performing the steps of claim 13 when the program is run on processing circuitry of a control unit equipped with a plurality of load sensors.

* * * * *